United States Patent
Gormish et al.

(10) Patent No.: US 9,189,468 B2
(45) Date of Patent: Nov. 17, 2015

(54) FORM FILLING BASED ON CLASSIFICATION AND IDENTIFICATION OF MULTIMEDIA DATA

(71) Applicants: Michael J. Gormish, Redwood City, CA (US); John W. Barrus, Menlo Park, CA (US); Edward L. Schwartz, Menlo Park, CA (US)

(72) Inventors: Michael J. Gormish, Redwood City, CA (US); John W. Barrus, Menlo Park, CA (US); Edward L. Schwartz, Menlo Park, CA (US)

(73) Assignee: Ricoh Company, Ltd., Tokyo (JP)

(*) Notice: Subject to any disclaimer, the term of this patent is extended or adjusted under 35 U.S.C. 154(b) by 310 days.

(21) Appl. No.: 13/789,672

(22) Filed: Mar. 7, 2013

(65) Prior Publication Data

US 2014/0258827 A1 Sep. 11, 2014

(51) Int. Cl.
*G06F 17/24* (2006.01)

(52) U.S. Cl.
CPC .................................. *G06F 17/243* (2013.01)

(58) Field of Classification Search
CPC ..................................................... G06F 17/243
USPC ........................................................ 715/224
See application file for complete search history.

(56) References Cited

U.S. PATENT DOCUMENTS

| | | | |
|---|---|---|---|
| 7,644,350 B2 | 1/2010 | Piersol | |
| 7,899,823 B1* | 3/2011 | Trandal et al. | 707/736 |
| 8,448,061 B1* | 5/2013 | Linburn | 715/224 |
| 8,885,951 B1* | 11/2014 | Cristofano et al. | 382/224 |
| 2004/0174434 A1* | 9/2004 | Walker et al. | 348/211.3 |
| 2004/0181749 A1* | 9/2004 | Chellapilla et al. | 715/505 |
| 2006/0190810 A1* | 8/2006 | Piersol | 715/506 |
| 2006/0206942 A1* | 9/2006 | Sweet | 726/26 |
| 2007/0133876 A1* | 6/2007 | Chande et al. | 382/181 |
| 2008/0030599 A1 | 2/2008 | Stavely | |
| 2008/0040259 A1* | 2/2008 | Snow et al. | 705/38 |
| 2008/0126396 A1* | 5/2008 | Gagnon | 707/102 |
| 2008/0267505 A1* | 10/2008 | Dabet et al. | 382/181 |
| 2008/0288338 A1* | 11/2008 | Wiseman et al. | 705/14 |
| 2009/0074303 A1* | 3/2009 | Filimonova et al. | 382/224 |
| 2010/0054601 A1* | 3/2010 | Anbalagan et al. | 382/180 |
| 2011/0010192 A1* | 1/2011 | Backhaus et al. | 705/2 |
| 2011/0150273 A1* | 6/2011 | Moore | 382/103 |
| 2011/0215146 A1* | 9/2011 | Shams | 235/383 |
| 2011/0225178 A1* | 9/2011 | Ingrassia et al. | 707/769 |
| 2011/0317885 A1* | 12/2011 | Leung et al. | 382/118 |
| 2012/0059676 A1 | 3/2012 | King | |
| 2012/0063684 A1* | 3/2012 | Denoue et al. | 382/175 |
| 2012/0239542 A1* | 9/2012 | Preston et al. | 705/35 |
| 2012/0293678 A1* | 11/2012 | Amor Molares et al. | 348/222.1 |
| 2013/0033522 A1* | 2/2013 | Calman et al. | 345/633 |
| 2013/0036347 A1* | 2/2013 | Eftekhari et al. | 715/222 |

(Continued)

OTHER PUBLICATIONS

Sarvas, Risto, Erick Herrarte, Anita Wilhelm, and Marc Davis. "Metadata creation system for mobile images." In Proceedings of the 2nd international conference on Mobile systems, applications, and services, pp. 36-48. ACM, 2004.*

(Continued)

*Primary Examiner* — Frank D Mills
(74) *Attorney, Agent, or Firm* — Patent Law Works LLP

(57) ABSTRACT

An electronic writing solution server includes a classification application that comprises a classifier and a user interface engine. The classifier receives multimedia data on a form, identifies at least one field in the form to be modified and modifies the at least one field in the form based on the multimedia data. The user interface engine provides the modified form to a user.

18 Claims, 12 Drawing Sheets

(56) References Cited

U.S. PATENT DOCUMENTS

| | | | | |
|---|---|---|---|---|
| 2013/0266194 | A1* | 10/2013 | Brookhart | 382/118 |
| 2013/0329943 | A1* | 12/2013 | Christopulos et al. | 382/103 |
| 2014/0096041 | A1* | 4/2014 | Gowen et al. | 715/753 |
| 2014/0108456 | A1* | 4/2014 | Ramachandrula et al. | 707/779 |
| 2014/0146200 | A1* | 5/2014 | Scott et al. | 348/231.99 |
| 2014/0241631 | A1* | 8/2014 | Huang et al. | 382/176 |
| 2014/0376786 | A1* | 12/2014 | Johnson et al. | 382/118 |
| 2015/0019305 | A1* | 1/2015 | Gorawala | 705/14.4 |

OTHER PUBLICATIONS

Computer Vision: A Modern Approach (2nd Edition) by David A. Forsyth and Jean Ponce, dated Nov. 5, 2011, 63 pages.

Learning OpenCV: Computer Vision in C++ with the OpenCV Library by Gary Bradski and Adrian Kaehler, Chapter 13, dated Dec. 25, 2012, 65 pages.

* cited by examiner

FORM FILLING BASED ON CLASSIFICATION AND IDENTIFICATION OF MULTIMEDIA DATA

BACKGROUND OF THE INVENTION

1. Field of the Invention

The specification relates to processing of forms. In particular, the specification relates to modifying a form based on classifying and identifying multimedia data received on the form.

2. Description of the Background Art

People fill out forms for a wide variety of purposes. As paper usage is reduced, an increasing number of forms are provided in electronic form and an increasing amount of information is included in the electronic forms. For example, a student may fill out all forms related to school activities. The forms could be admission application forms, class selection forms and graduation application forms. Each form contains a large amount of information. The admission application forms include a summary of a student's past school years, the class selection forms change every semester and the graduation application forms include the student's academic achievement. This tendency for using forms does not stop with school. Users need to fill out forms to get medical services, to buy a car, to get a mortgage, to obtain insurance, etc. Currently, the process is complex and time-consuming.

Some attempts have been made to reduce the number of fields that the user has to fill in. For example, there are browser extensions for saving a user's personal information, such as name and credit card number to make filling out forms for purchasing objects easier. However, these applications frequently insert the wrong information into fields and they can only insert information into fields that are the same as a previous form, for example a name, which reduces the usefulness of the applications.

SUMMARY OF THE INVENTION

The disclosure overcomes the deficiencies of the prior art with a system for modifying a form based on classifying and identifying multimedia data received on the form. In one embodiment, an electronic writing solution server includes a classification application comprising a classifier and a user interface engine. The classifier receives multimedia data on a form, identifies at least one field in the form to be modified and modifies the at least one field in the form based on the multimedia data. The user interface engine presents the modified form to a user.

Other aspects include corresponding methods, systems, apparatuses, and computer program products for these and other innovative aspects.

The system advantageously modifies a form by classifying and identifying the multimedia data received on the form. As a result, the system can be used to quickly fill out a form without a user manually inputting information in every field of the form. The features and advantages described herein are not all-inclusive and many additional features and advantages will be apparent to one of ordinary skill in the art in view of the figures and description. Moreover, it should be noted that the language used in the specification has been principally selected for readability and instructional purposes, and not to limit the scope of the inventive subject matter.

BRIEF DESCRIPTION OF THE DRAWINGS

The invention is illustrated by way of example, and not by way of limitation in the figures of the accompanying drawings in which like reference numerals are used to refer to similar elements.

FIG. 8 is a graphic representation of an example traffic accident and insurance report form.

FIG. 9 is a graphic representation of an example of a modified traffic accident and insurance report form.

DETAILED DESCRIPTION OF THE PREFERRED EMBODIMENTS

Figure 1:
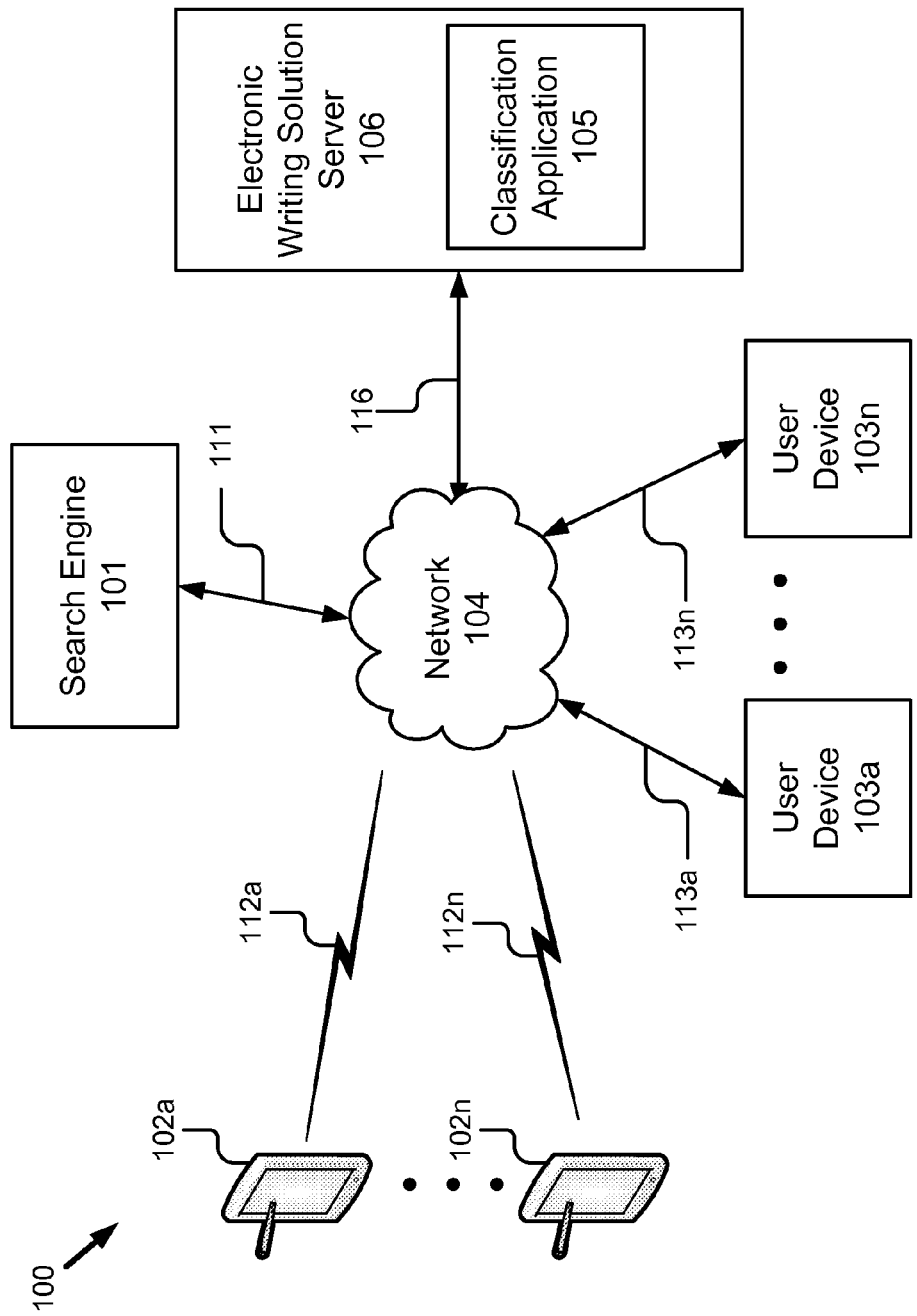
FIG. 1 is a high-level block diagram illustrating one embodiment of a system for modifying a form based on classifying and identifying multimedia data received on the form.

A description of system and method for modifying a form based on classifying and identifying multimedia data received on the form follows. For purposes of explanation, numerous specific details are set forth in order to provide a thorough understanding of the invention. It will be apparent, however, to one skilled in the art that the embodiments can be practiced without these specific details. In other instances, structures and devices are shown in block diagram form in order to avoid obscuring the invention. For example, the invention is described in one embodiment below with reference to user devices such as a smart phone and particular software and hardware. However, the description applies to any type of computing device that can receive data and commands, and any peripheral devices providing services.

Reference in the specification to "one embodiment" or "an embodiment" means that a particular feature, structure, or characteristic described in connection with the embodiment is included in at least one embodiment. The appearances of the phrase "in one embodiment" in various places in the specification are not necessarily all referring to the same embodiment.

Some portions of the detailed descriptions that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The invention also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic disks, read-only memories (ROMs), random access memories (RAMs), EPROMs, EEPROMs, magnetic or optical cards, flash memories including USB keys with non-volatile memory or any type of media suitable for storing electronic instructions, each coupled to a computer system bus.

Some embodiments can take the form of an entirely hardware embodiment, an entirely software embodiment or an embodiment containing both hardware and software elements. A preferred embodiment is implemented in software, which includes but is not limited to firmware, resident software, microcode, etc.

Furthermore, some embodiments can take the form of a computer program product accessible from a computer-usable or computer-readable medium providing program code for use by or in connection with a computer or any instruction execution system. For the purposes of this invention, a computer-usable or computer readable medium can be any apparatus that can contain, store, communicate, propagate, or transport the program for use by or in connection with the instruction execution system, apparatus, or device.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution. Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

Finally, the algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, the specification is not described with reference to any particular programming language. It will be appreciated that a variety of programming languages may be used to implement the teachings of the various embodiments as described herein.

System Overview

FIG. 1 illustrates a block diagram of a system 100 for modifying a form based on classifying and identifying multimedia data received on the form according to one embodiment. The system 100 includes a search engine 101, portable computing devices 102a-102n, user devices 103a-103n and an electronic writing solution server 106 that are each communicatively coupled to the network 104. In FIG. 1 and the remaining figures, a letter after a reference number, such as "102a" is a reference to the element having that particular reference number. A reference number in the text without a following letter, such as "102," is a general reference to any or all instances of the element bearing that reference number.

The network 104 is a conventional type, wired or wireless, and may have any number of configurations such as a star configuration, token ring configuration or other configurations known to those skilled in the art. Furthermore, the network 104 may comprise a local area network (LAN), a wide area network (WAN) (e.g., the Internet), and/or any other interconnected data path across which multiple devices may communicate. In yet another embodiment, the network 104 may be a peer-to-peer network. The network 104 may also be coupled to or includes portions of a telecommunications network for sending data in a variety of different communication protocols. In yet another embodiment, the network 104 includes Bluetooth communication networks or a cellular communications network for sending and receiving data such as via short messaging service (SMS), multimedia messaging service (MMS), hypertext transfer protocol (HTTP), direct data connection, wireless application protocol (WAP), email, etc. While only one network 104 is coupled to the plurality of user devices 103a-103n, the plurality of portable computing devices 102a-102n and the electronic writing solution server 106, in practice any number of networks 104 can be connected to the entities.

The portable computing devices 102a-102n are each wirelessly coupled to the network 104 via signal lines 112a-112n respectively. The portable computing device 102 is any computing device including a memory, a processor and wireless communication capability. For example, the portable computing device 102 can be a tablet computer, a personal digital assistant, a smart phone, etc. The portable computing device 102 is adapted to receive forms, enter information to the forms and send the forms to the electronic writing solution server 106. A form is any document that includes fields (e.g., blank spaces) for insertion of requested information. The form when filled out with the requested information may be a statement, an order, a request, etc. For example, a form can be a tax form, an insurance form, a medical form, an electronic check, a job application, a survey, a receipt, etc.

In one embodiment, the portable computing device 102 is a tablet computer including a computing pad and a stylus. The computing pad is adapted to display a form that includes user input. In one embodiment, the user input include strokes that are written on the form using a stylus or a fingertip by a user. The strokes are typically displayed on top of the form, just as if written by pen on paper. The computing pad usually receives the strokes as a sequence of points or segments along with location, timing and pressure information. In another embodiment, the user input also includes multimedia data such as a video, audio or an image. For example, the computing pad receives a video that is dropped in the form by a user. The form, the strokes and the multimedia data are in any format known to persons of ordinary skill in the art, for example, a Scalable Vector Graphics (SVG) file format that contains strokes and forms, an Ink Markup Language (InkML) format that contains only strokes, or a Synchronized Multimedia Integration Language (SMIL) format that contains multimedia data. In one embodiment, the computing pad also associates the form with metadata such as location and timing information. The portable computing device 102 determines location information by using global positioning system (GPS) circuitry or accessing a database including media access control (MAC) addresses. The portable computing device 102 sends the form along with user input (e.g., strokes and multimedia data) and metadata to the electronic writing solution server 106.

The search engine 101 is coupled to the network 104 via signal line 111. The search engine 101 is adapted to communicate with the electronic writing solution server 106 to identify multimedia data received on a form. In one embodiment, the search engine 101 includes a database for identifying people or objects included in multimedia data. For example, the search engine 101 receives a video clip with the faces of two people and searches the database to determine the identities (e.g., names) of the two people. In another example, the search engine 101 receives an image of an object with metadata that includes the GPS coordinates for where the picture was taken, performs a search of the object based on the GPS coordinates and returns a list of probable identities for the object. In one embodiment, the search engine 101 receives multimedia data from the electronic writing solution server 106 and sends an identification result for the multimedia data to the electronic writing solution server 106. For example, the search engine 101 receives a picture of a logo from the electronic writing solution server 106 and sends a name of the brand represented by the logo to the electronic writing solution server 106.

The user devices 103a-103n are each coupled to the network 104 via the signal lines 113a-113n respectively. The user device 103 is any computing device that includes a memory and a processor, for example, a desktop computer, a laptop computer, etc. The user device 103 is adapted to send and receive data to and from the electronic writing solution server 106. For example, the user device 103 sends a request to the electronic writing solution server 106 to load a form and receives the form from the electronic writing solution server 106. The user device 103 is accessed by users that have permission to access information from the electronic writing solution server 106, such as a creator of the form sent to portable computing devices 102 or an administrator of the electronic writing solution server 106.

The electronic writing solution server 106 is any computing device including a memory and a processor and is coupled to the network 104 via signal line 116. The electronic writing solution server 106 includes a classification application 105. The classification application 105 receives multimedia data on a form, identifies at least one field in the form to be modified and modifies the at least one field in the form based on the multimedia data. The classification application 105 is described in further detail below with reference to FIG. 2A.
Electronic Writing Solution Server 106

Figure 2A:
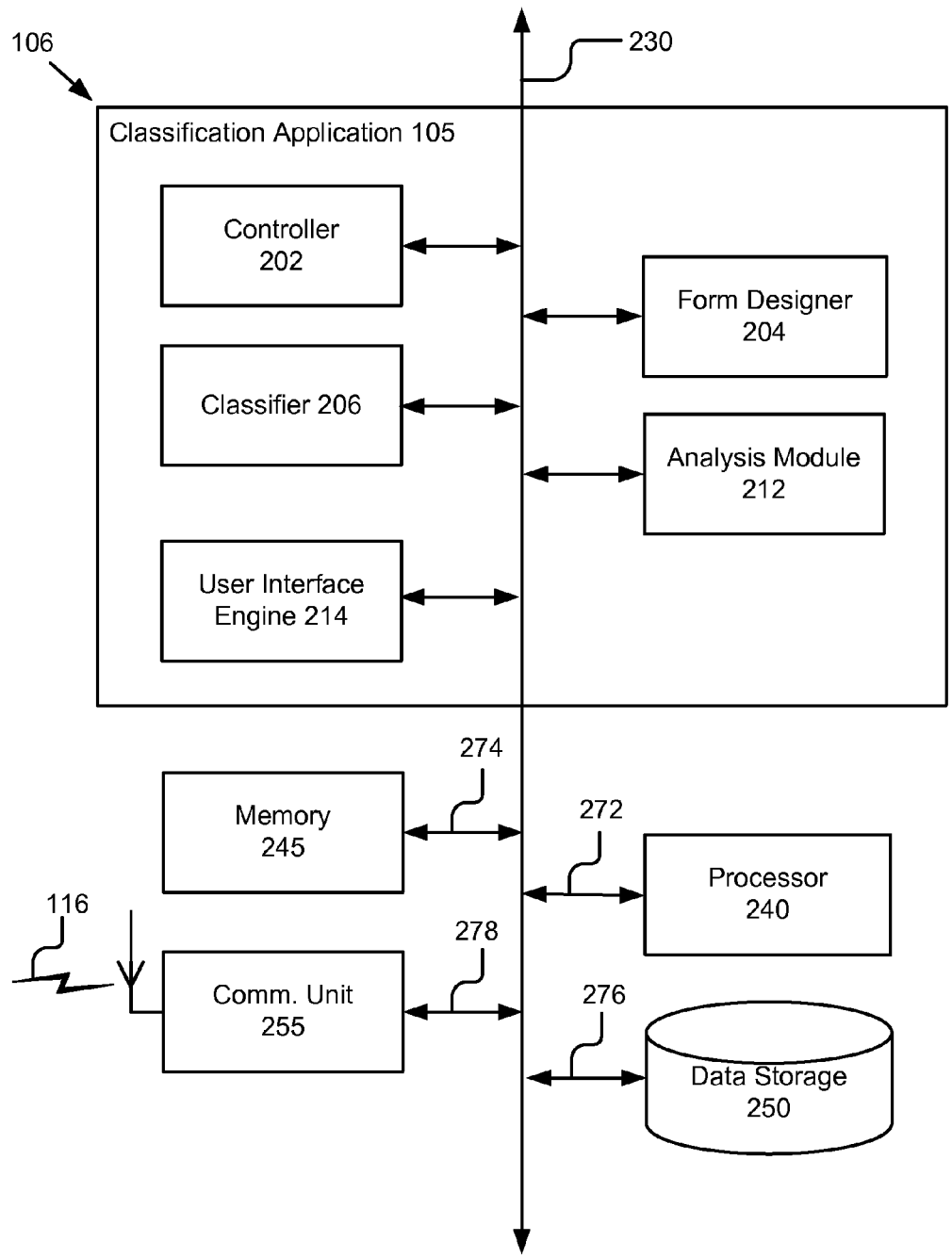
FIG. 2A is a block diagram illustrating one embodiment of a classification application in more detail.

Referring now to FIG. 2A, the classification application 105 is shown in more detail. FIG. 2A is a block diagram of the electronic writing solution server 106 that includes a processor 240, a memory 245, a communication unit 255, data storage 250 and the classification application 105.

The processor 240, the memory 245, the communication unit 255 and the data storage 250 are communicatively coupled to the bus 230. The bus 230 may represent one or more buses including an industry standard architecture (ISA) bus, a peripheral component interconnect (PCI) bus, a universal serial bus (USB), or some other bus known in the art to provide similar functionality.

The processor 240 comprises an arithmetic logic unit, a microprocessor, a general purpose controller or some other processor array to perform computations. The processor 240 is coupled to the bus 230 for communication with the other components via signal line 272. Processor 240 processes data signals and may comprise various computing architectures including a complex instruction set computer (CISC) architecture, a reduced instruction set computer (RISC) architecture, or an architecture implementing a combination of instruction sets. Although only a single processor is shown in FIG. 2A, multiple processors may be included. The processing capability may be limited to supporting the display of images and the capture and transmission of images. The processing capability might be enough to perform more complex tasks, including various types of feature extraction and sampling. It will be obvious to one skilled in the art that other processors, operating systems, sensors, displays and physical configurations are possible.

The memory 245 stores instructions and/or data that may be executed by processor 240. The memory 245 is coupled to the bus 230 for communication with the other components via signal line 274. The instructions and/or data may comprise code for performing any and/or all of the techniques described herein. The memory 245 may be a dynamic random access memory (DRAM) device, a static random access memory (SRAM) device, flash memory or some other memory device known in the art. In one embodiment, the memory 245 also includes a non-volatile memory or similar permanent storage device and media such as a hard disk drive, a floppy disk drive, a CD-ROM device, a DVD-ROM device, a DVD-RAM device, a DVD-RW device, a flash memory device, or some other mass storage device known in the art for storing information on a more permanent basis.

The communication unit 255 is hardware for receiving and transmitting data by linking the processor 240 to the network 104 and other processing systems. The communication unit 255 receives data such as user input for a form from the portable computing device 102 or the user device 103 and transmits the data, for example, multimedia data for modifying a form, to the classifier 206. The communication unit 255 also transmits data to the user device 103, for example, a blank form or a form modified based on multimedia data. The communication unit 255 is coupled to the bus 230 via signal line 278.

In one embodiment, the communication unit 255 includes a port for direct physical connection to the user device 103, the portable computing device 102 or to another communication channel. For example, the communication unit 255 includes an RJ45 port or similar port for wired communication with the user device 103. In another embodiment, the communication unit 255 includes a wireless transceiver 116 for exchanging data with the user device 103, the portable computing device 102 or any other communication channel using one or more wireless communication methods, such as IEEE 802.11, IEEE 802.16, Bluetooth® or another suitable wireless communication method.

In yet another embodiment, the communication unit 255 includes a cellular communications transceiver for sending and receiving data over a cellular communications network such as via short messaging service (SMS), multimedia messaging service (MMS), hypertext transfer protocol (HTTP), direct data connection, WAP, e-mail or another suitable type of electronic communication. In still another embodiment, the communication unit 255 includes a wired port and a wireless transceiver. The communication unit 255 also provides other conventional connections to the network 104 for distribution of files and/or media objects using standard network protocols such as TCP/IP, HTTP, HTTPS and SMTP as will be understood to those skilled in the art.

The data storage 250 is a non-transitory memory that stores instructions and/or data used for modifying a form based on classifying and identifying multimedia data received on the form. For example, the data storage 250 stores form templates, forms created based on the form templates, multimedia data received on forms and forms modified based on the multimedia data. The data storage 250 is coupled to the bus 230 for communication with the other components via signal line 276.

In one embodiment, the classification application 105 includes a controller 202, a form designer 204, a classifier 206, an analysis module 212 and a user interface engine 214.

The controller 202 is software and routines for receiving data via the communication unit 255, routing the data to appropriate components of the classification application 105 and transmitting responses from the components of the classification application 105 to the communication unit 255 for transmitting to the user device 103 and other components of the system 100. In one embodiment, the controller 202 is a set of instructions executable by the processor 240 to provide the functionality described below for managing data transfer between the components of the electronic writing solution server 106 and other components of the system 100. In another embodiment, the controller 202 is stored in the memory 245 and is accessible and executable by the processor 240. In either embodiment, the controller 202 is adapted for cooperation and communication with the processor 240, the communication unit 255 and other components of the electronic writing solution server 106.

The form designer 204 is software and routines for creating a form that accepts multimedia data. In one embodiment, the form designer 204 is a set of instructions executable by the processor 240 to provide the functionality described below for creating a form that accepts multimedia data. In another embodiment, the form designer 204 is stored in the memory 245 and is accessible and executable by the processor 240. In either embodiment, the form designer 204 is adapted for cooperation and communication with the processor 240, the communication unit 255 and other components of the electronic writing solution server 106.

In one embodiment, the form designer 204 determines a set of fields included in a form, associates fields in the set with a data type and a classifier, generates a form template to include the set of fields along with associated data types and classifiers, and creates the form that accepts multimedia data based on the form template. In another embodiment, the form designer 204 generates a blank form and receives designations from a user of locations in the form that are associated with fields including image regions. The user can also indicate classifiers that should be associated with images in the form. In one embodiment, a user designates associated fields that should be filled in by the output of the analysis and classification.

A field is the element in the form that accepts user input. In one embodiment, the form designer 204 determines which fields to include in a form based on the context of the form. For example, the form designer 204 receives a selection from a user of an expense reimbursement form and creates a form with a set of fields including an employee name field, a date field, one or more expense description fields, one or more amount fields, a total amount field, an employee signature field and a supervisor signature field. Once the set of fields included in a form is determined, the form designer 204 determines what type of user input a field accepts. For example, the form designer 204 determines that an age field receives a number as an input. In one embodiment, the data types include text and numeric data. In another embodiment, the data type also includes a multimedia type. The multimedia type includes one of a video (e.g., an animation, a video from a camera), audio (e.g., a song from radio, a sound from a microphone) and an image (e.g., a photo, a slide). The multimedia type also includes a combination of a video, audio, an image and other like types of media (e.g., a recording of a television broadcast that includes audio, video and caption text). In one embodiment, the field accepts metadata (e.g., data from sensors such as a compass, an accelerometer, a global positioning system (GPS). The form designer 204 determines a data type including a multimedia type for user input entered in a field and associates the data type with the field.

The form designer 204 collects samples of the form filled in by a plurality of users, creates a classifier for one or more fields in the form using the collected samples and associates each field in the form with the classifier. The classifier is used to classify a category for user input on the form. The classifier will be described in more detail below. In one embodiment, the form designer 204 first determines training data from the collected samples. For example, the form designer 204 determines whether to use a single handwritten character or an entire handwritten name in a name field of collected sample forms as training data. The form designer 204 then uses a learning algorithm to analyze the training data to summarize and explain key features of the training data. The learning algorithm includes supervised learning algorithms (e.g., linear regression, neural networks, naïve Bayes, etc.) and unsupervised learning algorithms (e.g., clustering, blind signal separation, etc.). For example, the form designer 204 collects 20 forms with a photo field and uses a clustering method to determine from the 20 photos that the photos typically include three categories. The form designer 204 creates a classifier based on the analysis of the training data and associates a field with a classifier.

The form designer 204 generates a form template to include the set of fields, data types associated with the set of fields and classifiers associated with the set of fields. The data types include multimedia types. The form designer 204 creates a form based on a form template. The form accepts multimedia data. In one embodiment, the form designer 204 stores forms and form templates in the data storage 250.

The classifier 206 is software and routines for identifying multimedia data received on a form and modifying the form based on the multimedia data. In one embodiment, the classifier 206 is a set of instructions executable by the processor 240 to provide the functionality described below for identifying multimedia data received on a form and modifying the form based on the multimedia data. In another embodiment, the classifier 206 is stored in the memory 245 and is accessible and executable by the processor 240. In either embodiment, the classifier 206 is adapted for cooperation and communication with the processor 240, the communication unit 255 and other components of the electronic writing solution server 106.

The form designer 204 creates a form that accepts multimedia data. The form includes a set of fields associated with classifiers. When a user inputs multimedia data on the form, one or more classifiers help the user to fill out the form by classifying objects or people in the multimedia. For example, a classifier uses the information included in multimedia data to populate a field in a form with category information. In this way, the classifier saves a user from the burden of manually inputting data in every field in the form.

Figure 2B:
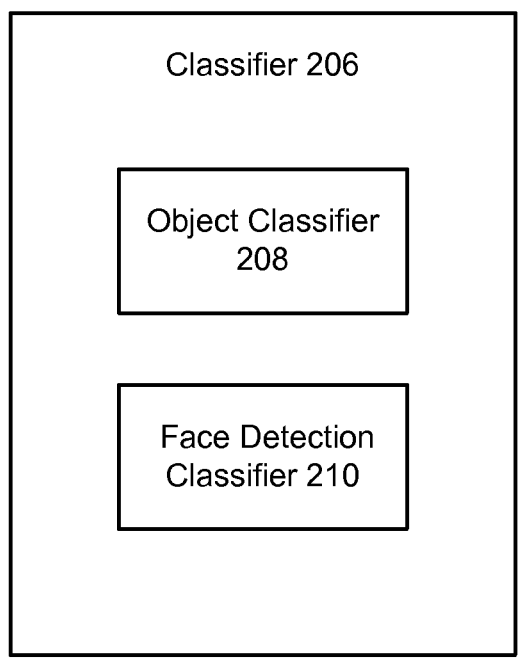
FIG. 2B is a block diagram illustrating one embodiment of a classifier.

The classifier 206 receives multimedia data on a form from a user via the controller 202, performs classification on the multimedia data, identifies at least one object or person from the multimedia data based on the classification and modifies at least one field in the form with the identification result. In one embodiment, the classifier 206 comprises an object classifier and a face detection classifier. The object classifier 208 and the face detection classifier 210 are depicted in FIG. 2B.

The object classifier 208 identifies at least one object from multimedia data received on a form and modifies the form with the information from the at least one object. The object classifier 208 performs classification on the received multimedia data by determining features of the multimedia data, determining one or more categories to which the multimedia data belongs based on the features and grouping the multimedia data into the one or more categories. For example, the object classifier 208 applies a classification algorithm to spectral data in an image and uses a simple threshold value or a complex statistically based decision rule to classify the spectral data. In one embodiment, the object classifier 208 classifies the multimedia data into a limited number of major categories. For example, the object classifier 208 receives sensor data about a landscape and distinguishes one or more specific categories of terrain within the landscape. The categories for the landscape would include water bodies, paved surfaces, irrigated agriculture, forest, etc.

In response to classifying the multimedia data received on a form into one or more categories, the object classifier 208 identifies at least one object based on the one or more categories and modifies the form with the identification result. Continuing with the above example, if the sensor data is grouped into a category of water bodies, a category of paved surfaces and a category of forests, the object classifier 208 determines that the landscape represented by the sensor data is a national park. As a result, the object classifier 208 populates "national park" in a landscape type field of a nature resource recording form. In one embodiment, the object classifier 208 also communicates with the search engine 101 via the controller 202 to identify an object. Continuing with the above example, the object classifier 208 determines that the landscape is a national park, and communicates with the search engine 101 to determine a name of the national park, a location of the national park, a size of the national park and other information for the national park. As a result, the object classifier 208 can modify more fields in the nature resource recording form with more identification information. For instance, the object classifier 208 adds the identification information to multiple fields in the form such as a landscape type field, a name field, a location field and a size field.

Similarly as the object classifier 208, the face detection classifier 210 identifies at least one person from multimedia data received on a form and modifies the form with information for the at least one person. The face detection classifier 210 first classifies multimedia data into a face category. For example, the face detection classifier 210 uses a facial recognition algorithm to analyze an image, identify landmarks on a face in the image including a position of the eyes, nose, cheekbones, jaw and mouth, and classify the image as being associated with a face category. Once the face detection classifier 210 determines that the multimedia data includes a face of a person, the face detection classifier 210 identifies characteristics of the person and modifies the form with the identified characteristics. For example, the face detection classifier 210 determines a person's gender based on studying the style of the person's hair. As a result, the face detection classifier 210 adds gender information to a gender field in a visitor registration form.

In one embodiment, the face detection classifier 210 also communicates with the search engine 101 via the controller 202 to determine characteristics of the person. Continuing with the above example, the face detection classifier 210 communicates with the search engine 101 to determine the name of the person. As a result, the face detection classifier 210 also adds the person's name in a name field of the visitor registration form.

The classifier 206 receives multimedia data on a form from a user via the controller 202, and classifies and identifies the multimedia data. The classifier 206 then modifies the form based on the multimedia data and instructs the user interface engine 214 to generate graphical data for displaying the modified form to the user. In one embodiment, the classifier 206 modifies the form by identifying at least one field in the form to be modified and modifying the at least one field in the form based on the multimedia data.

In the first embodiment, the classifier 206 analyzes the multimedia data received on a form, identifies at least one field in the form that is related to content in the multimedia data and modifies the at least one field in the form based on the content in the multimedia data. In this embodiment, the classifier 206 does not know whether multimedia data will be received on a form or what content the multimedia data will have if the multimedia data is received. When receiving the multimedia data on a form from a user, at least one of the object classifier 208 or the face detection classifier 210 analyzes the multimedia data to identify the content in the multimedia data. The object classifier 208 or the face detection classifier 210 then determines which fields in the form are related to the content in the multimedia data and modifies these fields accordingly. For example, a home owner is filling out a house survey form created by the form designer 204. The house survey form includes a house type field for receiving information about the house type (e.g., a townhouse, a single family house), a year of building field for receiving information about when the house was built (e.g., 1920s), a house direction field for receiving information about what direction the house is facing (e.g., north, southwest), etc. The home owner can drag a photo to a position of the form (e.g., an arbitrary position in the form) to fill out the form rather than entering data in every field in the form. The classifier 206 processes the photo in response to receiving the photo. Either the object classifier 208 or the face detection classifier 210 or both are used to analyze the photo and determine the content in the photo. In this example, the object classifier 208 determines that the photo includes an overview of a house. The object classifier 208 classifies the house as being the category of a single family house because of the size of the house and the appearance of only one mailbox in the picture. As a result, the object classifier 208 adds the "single family house" in the house type field. In addition to determining the house type, the object classifier 208 also communicates with the search engine 101 to identify that the house was built in 1950s based on the architectural style of the house being a ranch and the building materials used to construct the house. As a result, the object classifier 208 also populates the built time field with the category value "1950s."

In this embodiment, the number of fields and how many fields in the form are to be modified are not predefined. The classifier 206 determines the specific fields to be modified depending on the classification and identification result for the multimedia data received on the form. Continuing with the above example, the object classifier 208 will modify the house direction field if the object classifier 208 also identifies what direction the house is facing from the photo. Otherwise the object classifier 208 will only modify the house type field and the year built field.

In one embodiment, the classifier 206 also determines whether to generate additional fields in the form to include the content in the multimedia data. In response to determining to generate additional fields, the classifier 206 communicates with the form designer 204 to add one or more fields to the form. For example, the above house survey form also includes two fields for receiving information about rooms in a level (e.g., the first floor). The first field is a room number field for receiving information about how many rooms are in the level. The second field is a room type field for receiving information about what types of rooms are in the level. A home owner can enter a video into a field on the form. The video shows a two-level house. Since the fields in the form are not sufficient to include information of the rooms in the second floor, the classifier 206 communicates with the form designer 204 to generate additional fields to include information for the rooms in the second floor. The additional fields are generated based on the form template associated with a form. Continuing with the above example, the classifier 206 communicates with the form designer 204 to generate a second room number field and a second room type field for the rooms on the second floor. Other fields that are not included in the form template will not be generated.

In one embodiment, the classifier 206 modifies a field in a form by populating a value in the field. In another embodiment, the classifier 206 modifies a field in a form by populating a ranked list of potential values in the field with the most likely one on the top of the list. A user can select an appropriate value from the list. For example, the object classifier 208 determines that a house was built in 1950s based on the architectural style of the house and the building materials. However, the same architectural style and building materials were also used in early 1960s. The object classifier 208 determines that it is possible that the house was built in 1960s. As a result, the object classifier 208 populates a list with two values in a year built field in a house survey form. The class "1950s" ranks higher than the class "1960" and therefore is listed first in the list. In both embodiments, the classifier 206 can receive a user's intervention for the value(s) populated in a field. In this case, a user's preference takes priority. For example, a user prefers to leave a field blank even if the classifier 206 gives a value or a list of potential values in the field based on processing the multimedia data received on the form.

In another embodiment, the classifier 206 receives multimedia data on a form, where the multimedia data is associated with at least one field of the form. The classifier 206 analyzes the multimedia data to identify at least one person or object, identifies the at least one field in the form and populates other fields in the form based on the analysis. In this embodiment, the classifier 206 expects to receive certain content from multimedia data entered into a field of a form. Either the object classifier 208 or the face detection classifier 210 identifies the content from the multimedia data and modifies certain fields in the form in response to receiving the multimedia data. For example, a form designer 204 creates an inventory form for a user recording stock of items such as clothes, shoes, etc. The form accepts multimedia data such as a picture of clothing. The clothing picture is associated with an item type field in the form. The clothing picture is also associated with fields in the form including a type field (e.g., boy's clothing, girl's clothing, woman's clothing or man's clothing), a brand field and a size field. When a user fills out the inventory form by inserting a clothing picture, the object classifier 208 determines that the item type field, the type field, the brand field and the size field will be modified. The object classifier 208 determines category values corresponding to the four fields and populates the four fields with the category values. The object classifier 208 first classifies the picture as being in the category of clothing and populates the item type field with a category of "clothing" or a list of potential categories with the category "clothing." The object classifier 208 then identifies the type, the brand and the size from the clothing picture and populates the type field, the brand field and the color field with a category or a list of potential categories. For instance, the object classifier 208 communicates with the search engine 101 to classify the clothing in the picture as being associated with a particular brand and populates the brand field with search results. The user selects the appropriate size from the two sizes.

In yet another embodiment, the classifier 206 classifies the multimedia data based on a set of classifiers associated with fields in the form, identifies at least one field in the form to include the classified multimedia data and modifies the at least one field in the form based on the classified multimedia data. In this embodiment, the classifier 206 expects to receive multimedia data that may affect multiple fields in a form. However, the classifier 206 does not know what fields the multimedia data will affect. In one example, a home owner is filling out a house survey form including fields for receiving information about one or more bedrooms, kitchens, living rooms and yards. When the home owner drags multiple pictures of a house into the form to fill out the form, a set of classifiers including the object classifiers 208 and the face detection classifiers 210 classify the multiple pictures. In response to determining that the multiple pictures include pictures of a bedroom, a kitchen and a front yard, one or more object classifiers 208 identify the fields in the form for receiving information about a bedroom, a kitchen and a yard, and modify the fields according to the identified information from the multiple pictures. In another example, the classifier 206 receives a video entered into a field of an inventory form and determines that the video includes information for at least two categories: shoes and clothing. The classifier 206 identifies the fields receiving the information about clothing, for example, the type, the size and the brand, and modifies these fields based on the identification information for the clothing. For instance, the classifier 206 determines the type and the size of the clothing from the video and populates the type field and the size field with the information. However, the classifier 206 cannot determine the brand of the clothing because of low resolution of the video. As a result, the classifier 206 will not modify the brand field. Similarly, the classifier 206 identifies a set of fields that is related to the shoes, identifies the information for the shoes from the video and modifies a subset of fields or an entire set of fields based on the identification information for the shoes.

In one embodiment, the classifier 206 classifies and identifies multimedia data received on a form, and modifies at least one field in the form. In another embodiment, the classifier 206 classifies and identifies multimedia data received on a form, sends the multimedia data to the analysis module 212 for advanced identification and modifies at least one field in the form in response to receiving an identification result from the analysis module 212. In one embodiment, the classifier 206 stores the multimedia data and the form in the data storage 250.

The analysis module 212 is software and routines for analyzing the multimedia data received from the classifier 206. In one embodiment, the analysis module 212 is a set of instructions executable by the processor 240 to provide the functionality described below for analyzing the multimedia data received from the classifier 206. In another embodiment, the analysis module 212 is stored in the memory 245 and is accessible and executable by the processor 240. In either embodiment, the analysis module 212 is adapted for cooperation and communication with the processor 240, the communication unit 255 and other components of the electronic writing solution server 106.

In one embodiment, the analysis module 212 analyzes the multimedia data received from the classifier 206, determines values for at least one field in a form and transmits the values to the classifier 206 to modify the at least one field in the form. In one embodiment, the analysis module 212 analyzes the multimedia data received from the face detection classifier 210. For example, the face detection classifier 210 determines that a photo includes faces of people. The analysis module 212 receives the photo from the face detection classifier 210 and counts how many faces are in the photo. In another embodiment, the analysis module 212 analyzes the multimedia data received from the object classifier 208. For example, the object classifier 208 determines that a picture includes a lake and a few trees on the lakeside. The analysis module 212 receives the picture from the object classifier 208, and determines an average color in the picture (e.g., green), the percentage of water (e.g., 60%) and a distance between a tree to the nearest tree (e.g., two meters).

The analysis module 212 transmits the identification result for the multimedia data received on a form to the classifier 206. The classifier 206 modifies at least one field in the form according to the identification result. For example, a user drops a picture of clothing into an inventory form. The object classifier 208 classifies the clothing in the picture as being a t-shirt. The object classifier 208 sends the picture to the analysis module 212. The analysis module 212 analyzes the difference of hue in the picture, and determines that the color of the clothing could be cherry, vermilion or scarlet. As a result, the object classifier 208 populates the color field in the inventory form with a list of cherry, vermilion or scarlet. The user selects the appropriate color from the three options.

The user interface engine 214 is software and routines for generating graphical data for displaying a user interface. In one embodiment, the user interface engine 214 is a set of instructions executable by the processor 240 to provide the functionality described below for generating the user interface. In another embodiment, the user interface engine 214 is stored in the memory 245 and is accessible and executable by the processor 240. In either embodiment, the user interface engine 214 is adapted for cooperation and communication with the processor 240, the communication unit 255 and other components of the electronic writing solution server 106.

In one embodiment, the user interface engine 214 generates graphical data for displaying a blank form to a user. In another embodiment, the user interface engine 214 generates graphical data for receiving user input to a form, for example, an audio clip. In yet another embodiment, the user interface engine 214 generates graphical data for presenting a modified form to a user. The form is modified based on classification and identification of multimedia data received on the form.

Methods

Figure 3:
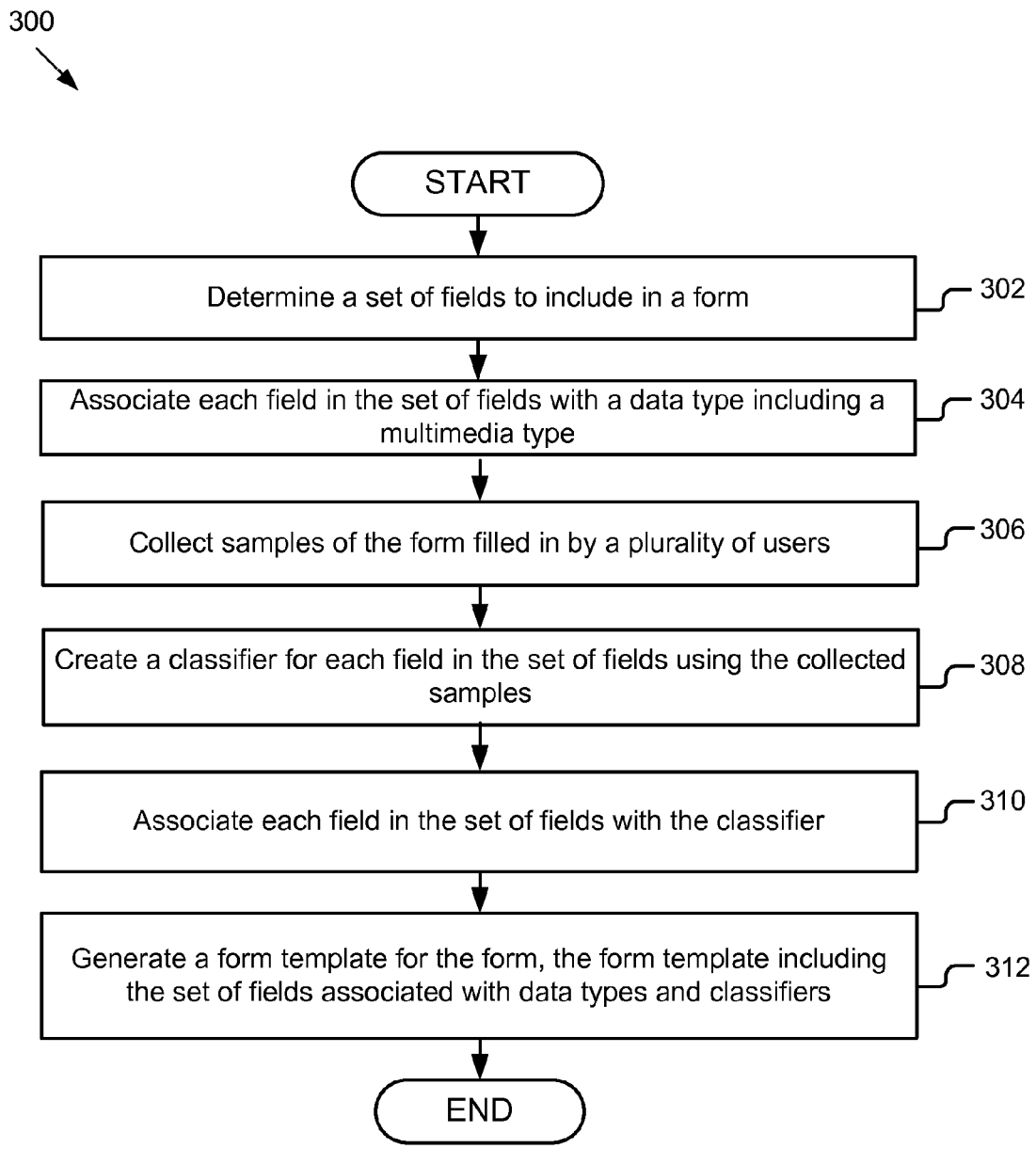
FIG. 3 is a flow diagram of one embodiment of a method for creating a form that accepts multimedia data.

Referring now to FIGS. 3-7, the methods of the invention will be described in more detail. FIG. 3 is a flow diagram 300 that illustrates one embodiment of a method for creating a form that accepts multimedia data. The classification application 105 includes a form designer 204. The form designer 204 determines 302 a set of fields to include in a form. In one embodiment, the form designer 204 determines which fields to include in a form based on the context of the form. For example, the user selects a type of form as being for car insurance. The form designer 204 creates suggested fields for the user that include the name of the car owner, the type of vehicle, the year the car was made, the make and model of the car, the color of the car, etc.

The form designer 204 associates 304 each field in the set of fields with a data type including a multimedia type. In one embodiment, the data type includes one of text and numeric data. In another embodiment, the data type also includes a multimedia type. The multimedia type includes one of video (e.g., an animation, a video from a camera), audio (e.g., a song from radio, a sound from a microphone) and image (e.g., a photo, a slide). The multimedia type also includes a combination of a video, audio, an image and other like types of media (e.g., a recording of a television broadcast that includes audio, video and caption text). The form designer 204 determines a data type including a multimedia type for user input entered in a field and associates the data type with the field.

The form designer 204 collects 306 samples of the form filled in by a plurality of users. The form designer 204 creates 308 a classifier for each field in the set of fields using the collected samples. The form designer 204 associates 310 each field in the set of fields with the classifier. In one embodiment, the form designer 204 first determines training data from the collected samples. The form designer 204 then uses a learning algorithm to analyze the training data to summarize and explain key features of the training data. The form designer 204 creates a classifier based on the analysis of the training data and associates a field with a classifier. The form designer 204 generates 312 a form template for the form, the form template including the set of fields associated with data types and classifiers.

Figure 4:
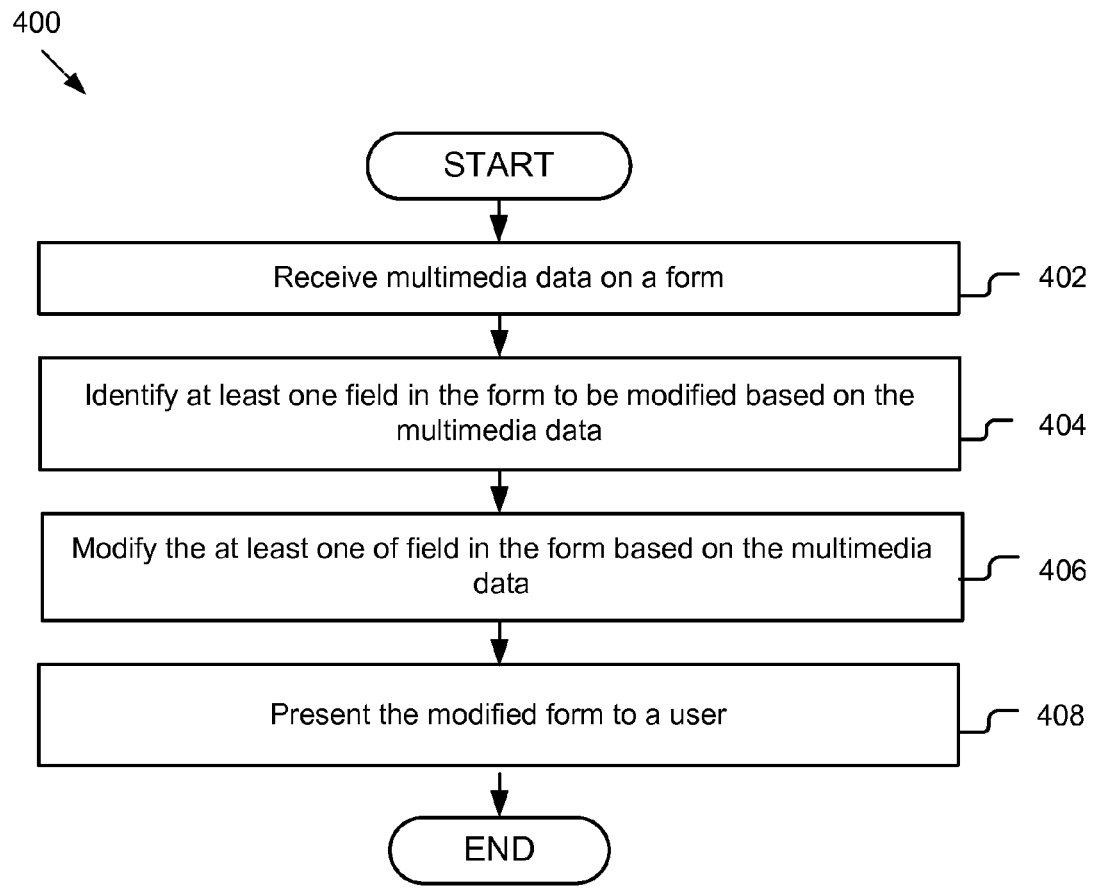
FIG. 4 is a flow diagram of one embodiment of a method for modifying a form based on multimedia data.

FIG. 4 is a flow diagram 400 that illustrates one embodiment of a method for modifying a form based on multimedia data. The classification application 105 includes a controller 202, a classifier 206 and a user interface engine 214. The classifier 206 receives 402 multimedia data on a form via the controller 202. The classifier 206 identifies 404 at least one field in the form to be modified based on the multimedia data. The classifier 206 modifies 406 the at least one field in the form based on the multimedia data. In one embodiment, the classifier 206 receives multimedia data on a form from a user via the controller 202, performs semantic classification on the multimedia data, identifies at least one object or person from the multimedia data based on the classification and modifies at least one field in the form with the identification result. The classifier 206 instructs the user interface engine 214 to present 408 the modified form to a user.

Figure 5:
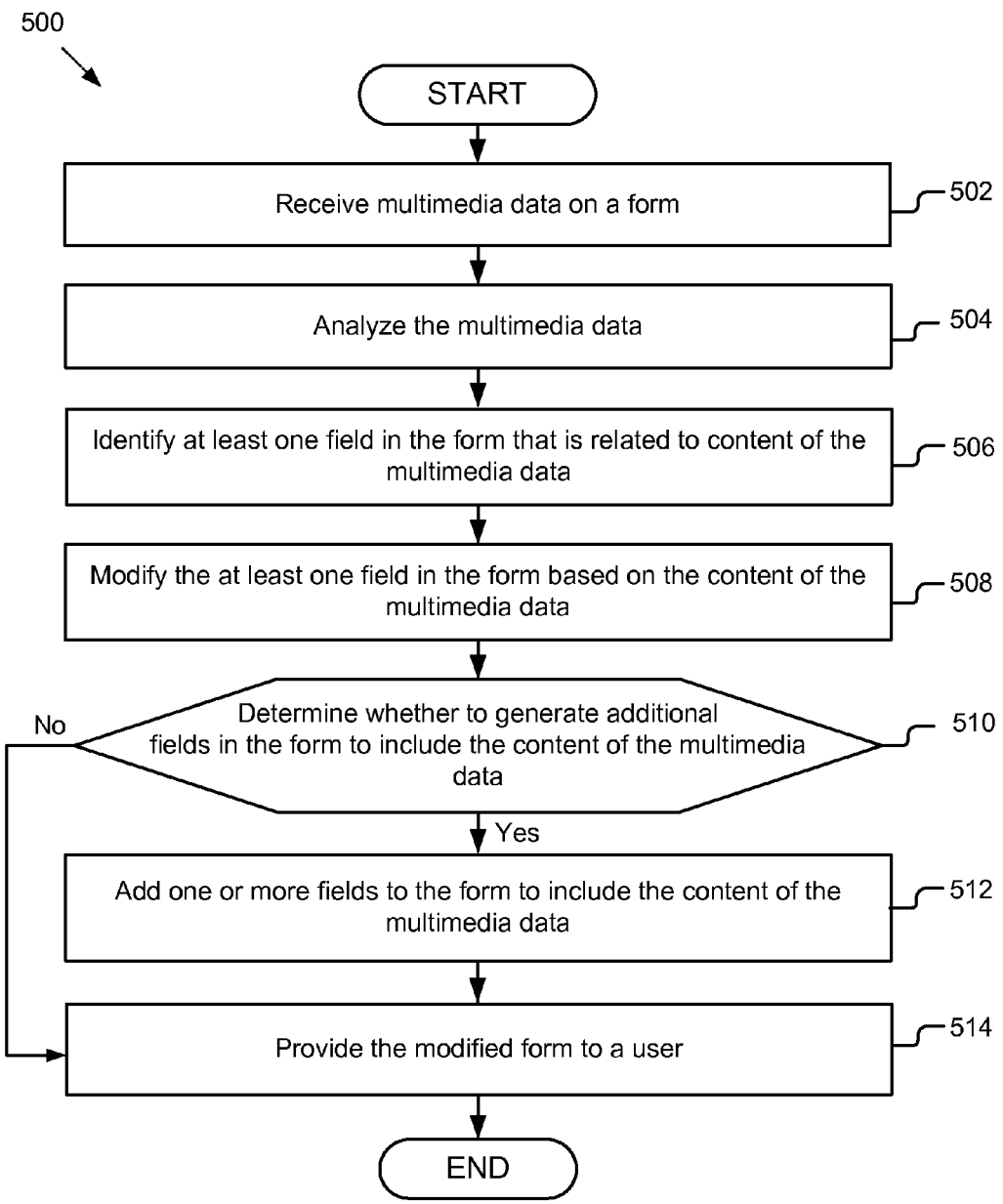
FIG. 5 is a flow diagram of a first embodiment of a method for modifying a form based on multimedia data.

FIG. 5 is a flow diagram 500 that illustrates a first embodiment of a method for modifying a form based on multimedia data. The classification application 105 includes a controller 202, a classifier 206 and a user interface engine 214. In one embodiment, the classifier 206 comprises an object classifier 208 and a face detection classifier 210. The classifier 206 receives 502 multimedia data on a form via the controller 202. The classifier 206 analyzes 504 the multimedia data. For example, the multimedia is an image of a car that is entered into a field of an insurance form for reporting an accident. The classifier 206 identifies 506 at least one field in the form that is related to content in the multimedia data. For example, the classifier 206 determines that the image is a Toyota, Honda or Kia. The classifier 206 modifies 508 the at least one field in the form based on the content in the multimedia data. For example, the classifier 206 instructs the user interface engine 214 to generate a drop down box for a car field that is populated with the Toyota, Honda or Kia as options. The classifier 206 would also instruct the user interface engine 214 to generate an option for the user to type in another type of car in case the classifier 206 misidentified the car type.

The classifier 206 determines 510 whether to generate additional fields in the form to include the content in the multimedia data. In response to determining to generate additional fields in the form, the classifier 206 adds 512 one or more fields to the form to include the content in the multimedia data. Otherwise, the method 500 goes to step 514. In one embodiment, the classifier 206 communicates with the form designer 204 to add additional fields to the form based on the form template associated with the form. The classifier 206 instructs the user interface engine 214 to generate graphical data for displaying the user interface. The user interface engine 214 provides 514 the modified form to a user via the communication unit 255.

Figure 6:
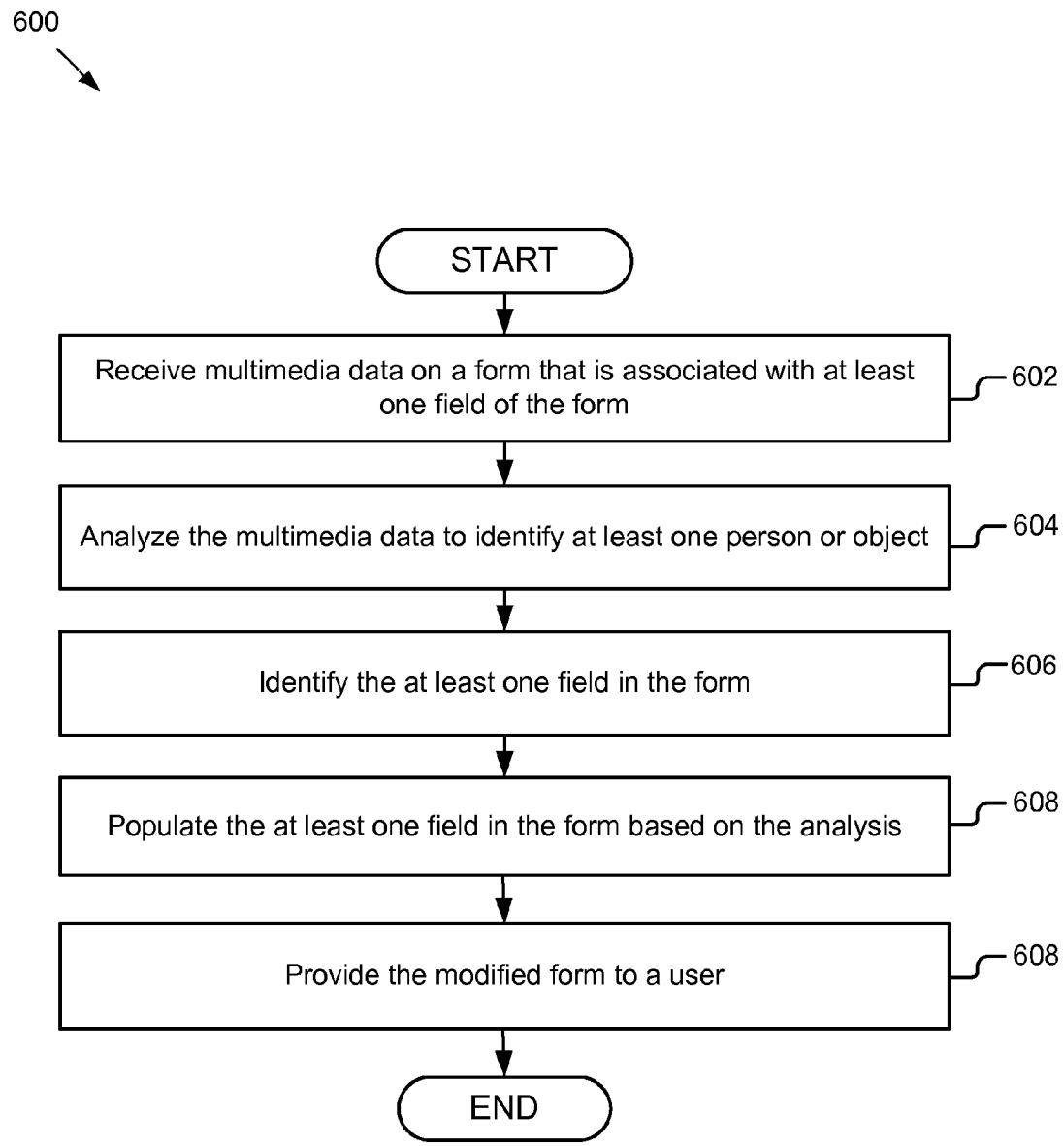
FIG. 6 is a flow diagram of a second embodiment of a method for modifying a form based on multimedia data.

FIG. 6 is a flow diagram 600 that illustrates a second embodiment of a method for modifying a form based on multimedia data. The classification application 105 includes a controller 202, a classifier 206 and a user interface engine 214. In one embodiment, the classifier 206 comprises an object classifier 208 and a face detection classifier 210. The classifier 206 receives 602 multimedia data on a form via the controller 202 that is associated with at least one field in the form. The classifier 206 analyzes 604 the multimedia data to identify at least one person or object. For example, the classifier 206 identifies the car as a Ford F-150. The classifier 206 identifies 606 the at least one field in the form. In this example, the classifier 206 identifies the type of vehicle field, the make field and the model field. The classifier 206 populates 608 the at least one field in the form based on the analysis. In this example, the classifier 206 identifies the vehicle as a car, the make as a Ford and the model as F-150. In some embodiments, the classifier 206 sends the multimedia to the analysis module 212 for further processing. For example, the analysis module 212 identifies the car as being blue and the classifier 206 populates the color field with blue.

The classifier 206 instructs the user interface engine 214 to generate graphical data for displaying the modified form. The user interface engine 214 provides 608 the modified form to a user via the communication unit 255.

Figure 7:
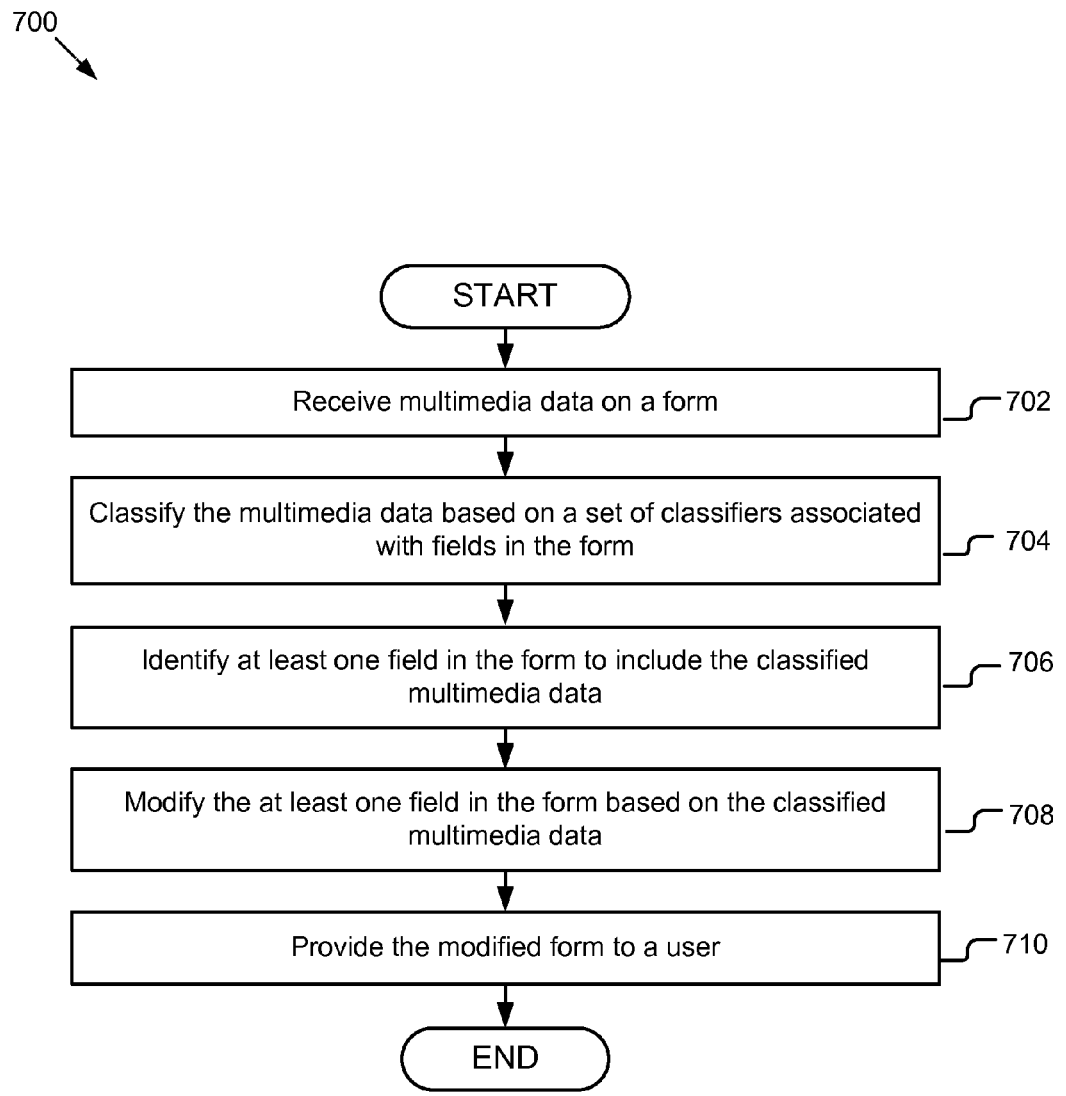
FIG. 7 is a flow diagram of a third embodiment of a method for modifying a form based on multimedia data.

FIG. 7 is a flow diagram 700 that illustrates a third embodiment of a method for modifying a form based on multimedia data. The classification application 105 includes a controller 202, a classifier 206 and a user interface engine 214. The classifier 206 receives 702 multimedia data on a form via the controller 202. For example, the classifier 206 receives a picture of a family. The classifier 206 classifies 704 the multimedia data based on a set of classifiers associated with fields in the form. For example, the classifier 206 identifies the people in the image and determines that the people are part of an insurance form. The classifier 206 could also send the image to the analysis module 212, which provides a number of people in the image. The classifier 206 identifies 706 at least one field in the form to include the classified multimedia data. The classifier 206 and the analysis module 212 determine the names of the people in the image, their gender and their hair color. The classifier 206 modifies 708 the at least one field in the form based on the classified multimedia data. For example, the form initially had fields for one person. The classifier 206 adds fields for the other three people in the picture and populates the fields for all four people. The classifier 206 instructs the user interface engine 214 to generate graphical data for displaying the modified form. The user interface engine 214 provides 710 the modified form to a user.

In one embodiment, the classifier 206 receives multiple pieces of media and determines how the different pieces correspond to fields in the form. For example, the classifier 206 receives an image of a first car from the side, an image of a second car from the back and an image of the first car that was damaged by a second car. The classifier 206 determines that for a traffic accident and insurance report, the first image is of the insurance owner's car. For example, the classifier 206 determines the make and model of the car and it matches the make and model of the car on record for the insurance owner. The classifier 206 uses the first image to populate fields about the insurance owner's car. The classifier 206 determines that the second image is a picture of the second car involved in the accident because the classifier 206 identifies the license plate from the image and determines that it is not associated with the car on record for the insurance owner. The classifier 206 populates a field for the license plate of the other car involved in the accident with the license place in the second image. Lastly, the classifier 206 determines that the third image is a picture of the accident. The user enters the image into a field in a damages section of the form and the classifier 206 classifies the image.

Example Forms and Modified Forms

Figure 8:
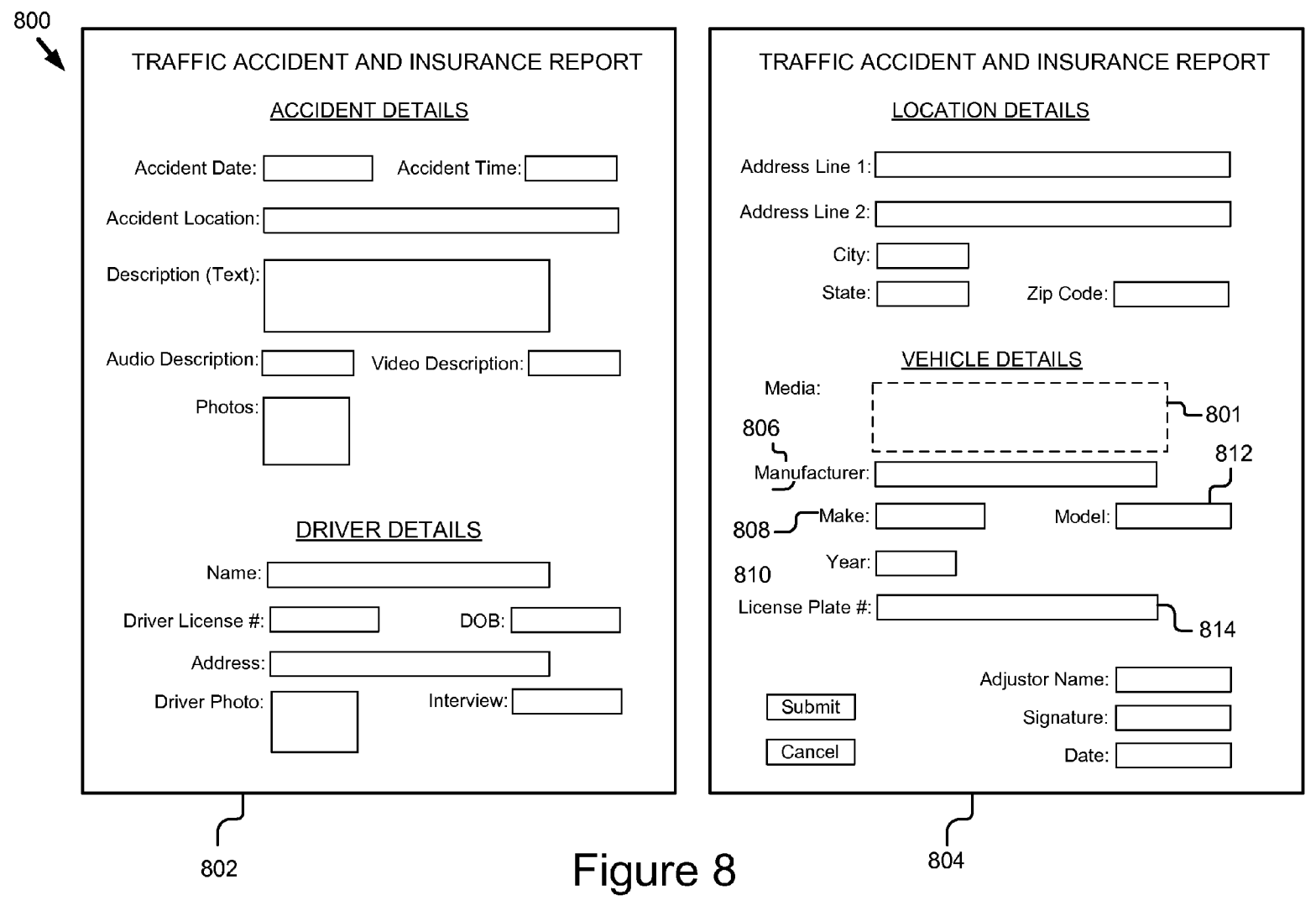

FIG. 8 is a graphic representation of an example traffic accident and insurance report form. The two-page form 800 can be filled out by an insurance adjuster to report an accident. On the first page 802, the form 800 includes an "Accident Details" section for receiving information about the accident and a "Driver Details" section for receiving information about the driver involved in the accident. On the second page 804, the form 800 includes a "Location Details" section for receiving information about the location where the accident occurred and a "Vehicle Details" section for receiving information about the vehicle involved in the accident. The "Vehicle Details" section on the second page 804 includes a media region 801, a manufacturer field 806, a make field 808, a year field 810, a model field 812 and a license plate number field 814. The form 800 accepts multimedia data in the media region 801. For example, an insurance adjuster can orally dictate a description of the accident scene using a voice recorder and enter the recorded audio into a field of the form 800. Or the adjuster may use a video recorder to record the accident scene and enter the video recording into a field of the form 800. The adjuster may also take photos of the accident scene and enter the photos into a field in the form 800. The classifier 206 then classifies the media and modifies the form accordingly.

Figure 9:
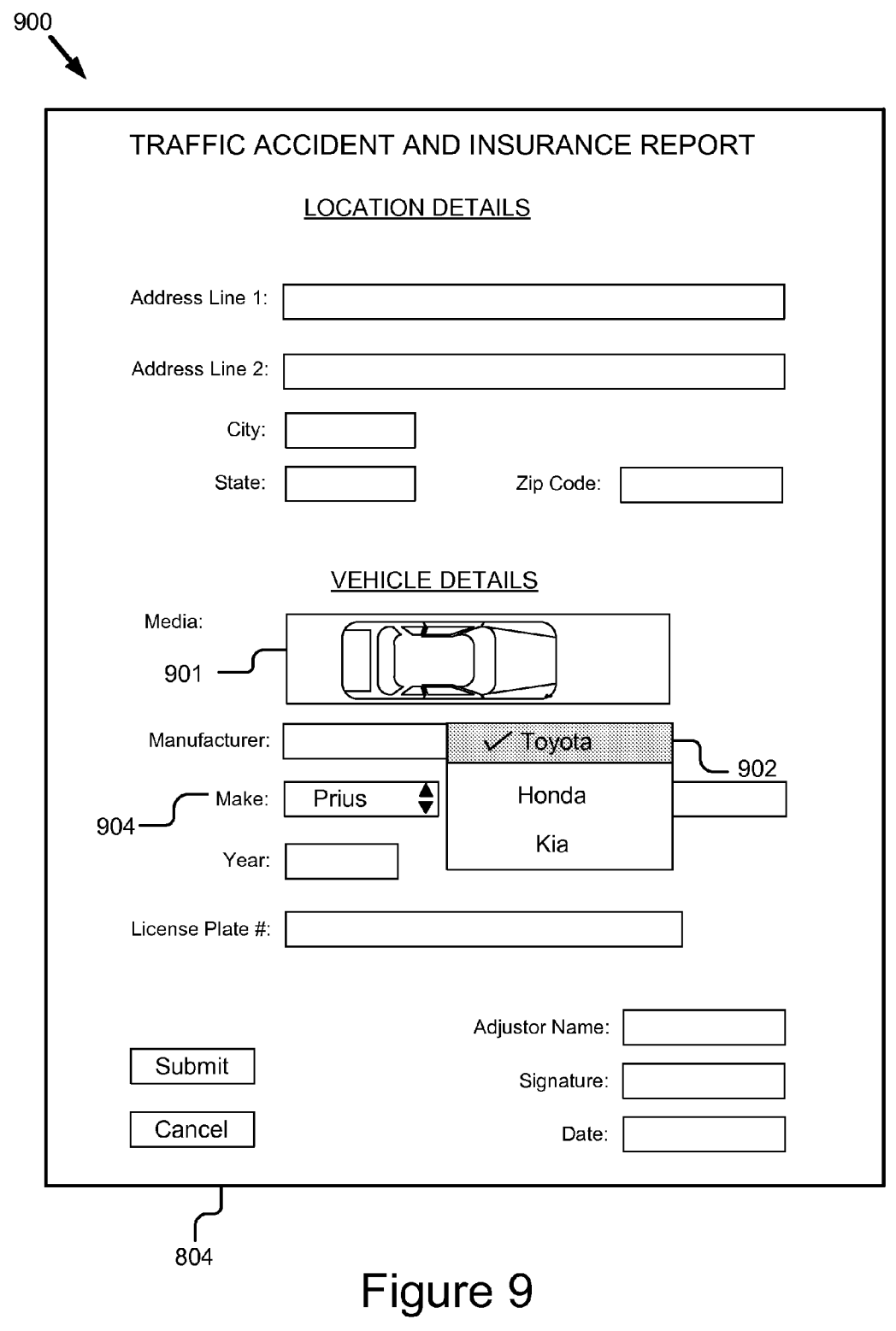

FIG. 9 is a graphic representation of an example form 900 that is modified based on the traffic accident and insurance report form shown in FIG. 8. When an insurance adjuster uses multimedia data to fill out the form 800, the classifier 206 communicates with the analysis module 212 and the search engine 101 to classify and identify the multimedia data and modifies the form 800 based on the processing result of the multimedia data. The resultant form is the form 900. For instance, the user enters the photo into the media region 901 in the form 900. The classifier 206 receives a photo of an accident scene and determines that there is a car in the photo. The classifier 206 identifies a car logo from the photo and communicates with the analysis module 212 and the search engine 101 to determine that the manufacturer of the car in the photo is Toyota. The classifier 206 provides a ranked list of manufacturers that includes Toyota, Honda and Kia from the highest rank to the lowest rank in the field 902. The insurance adjuster can select Toyota from the list instead of manually investigating the manufacturer and inputting a manufacturer name in the field 902. Or the adjuster can select Honda or Kia from the list if the adjuster does not think the car is a Toyota car. The classifier 206 also communicates with the analysis module 212 and the search engine 101 to determine that the make of the car is Prius (e.g., from the size, shape or style) and lists the value "Prius" in the field 904. If the classifier 206 determines more information from the photo, then more values will be populated in more fields. In this example, the classifier 206 does not identify information about the year that the car was produced and the license plate number of the car. As a result, the year field and the license plate number field in the form 900 are empty. If the classifier 206 determines from the photo that more than one vehicle is involved in the accident, the classifier 206 will communicate with the form designer 204 to generate more fields in the "Vehicle Details" section in the form 900.

Figure 10:
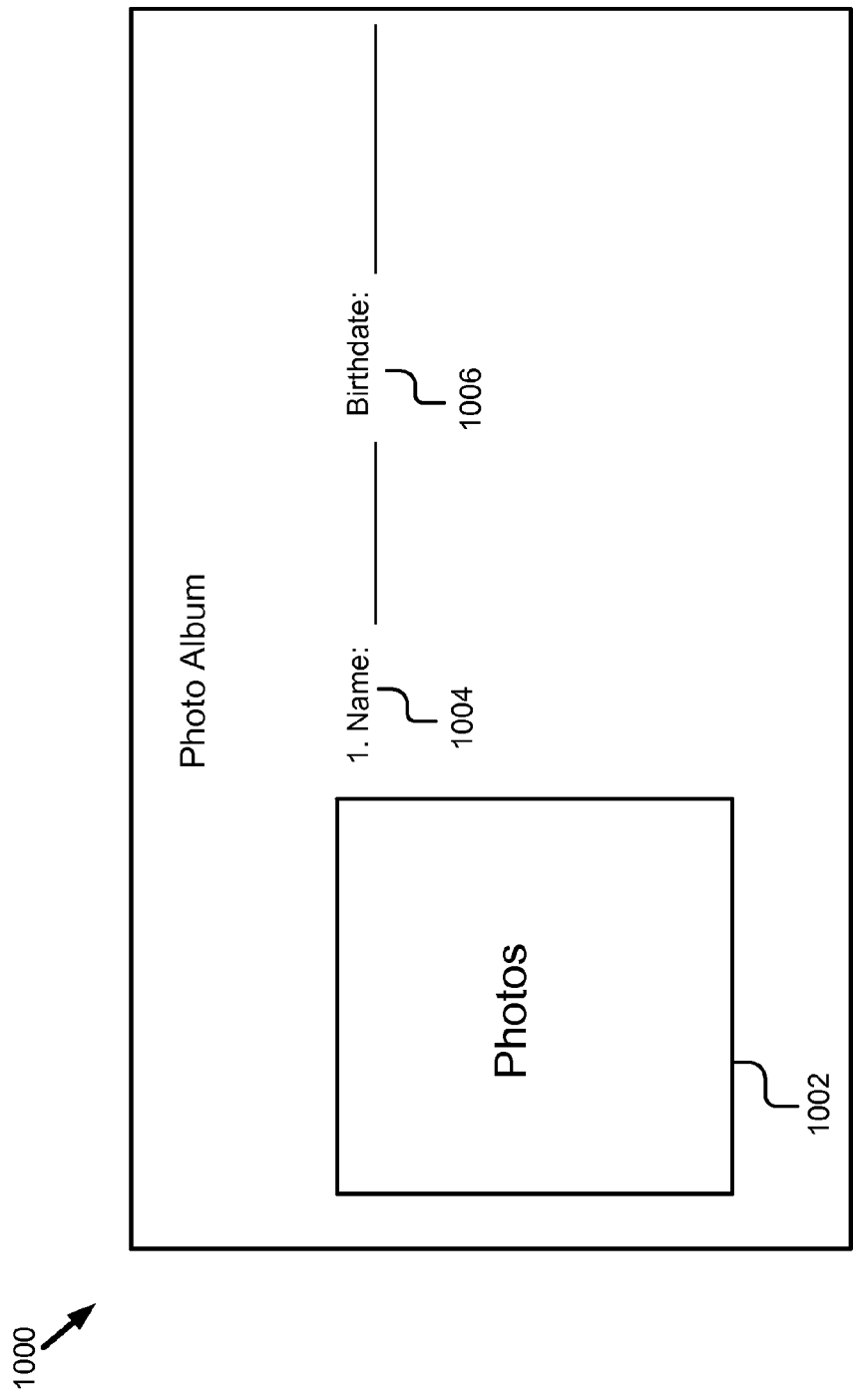
FIG. 10 is a graphic representation of an example photo album.

FIG. 10 is a graphic representation of an example photo album 1000. The photo album 1000 receives multimedia data such as a photo. The photo album 1000 includes a field 1002 for receiving photos of one or more persons, a field 1004 for receiving the name of a person and a field 1006 for receiving the birthdate of the person.

Figure 11:
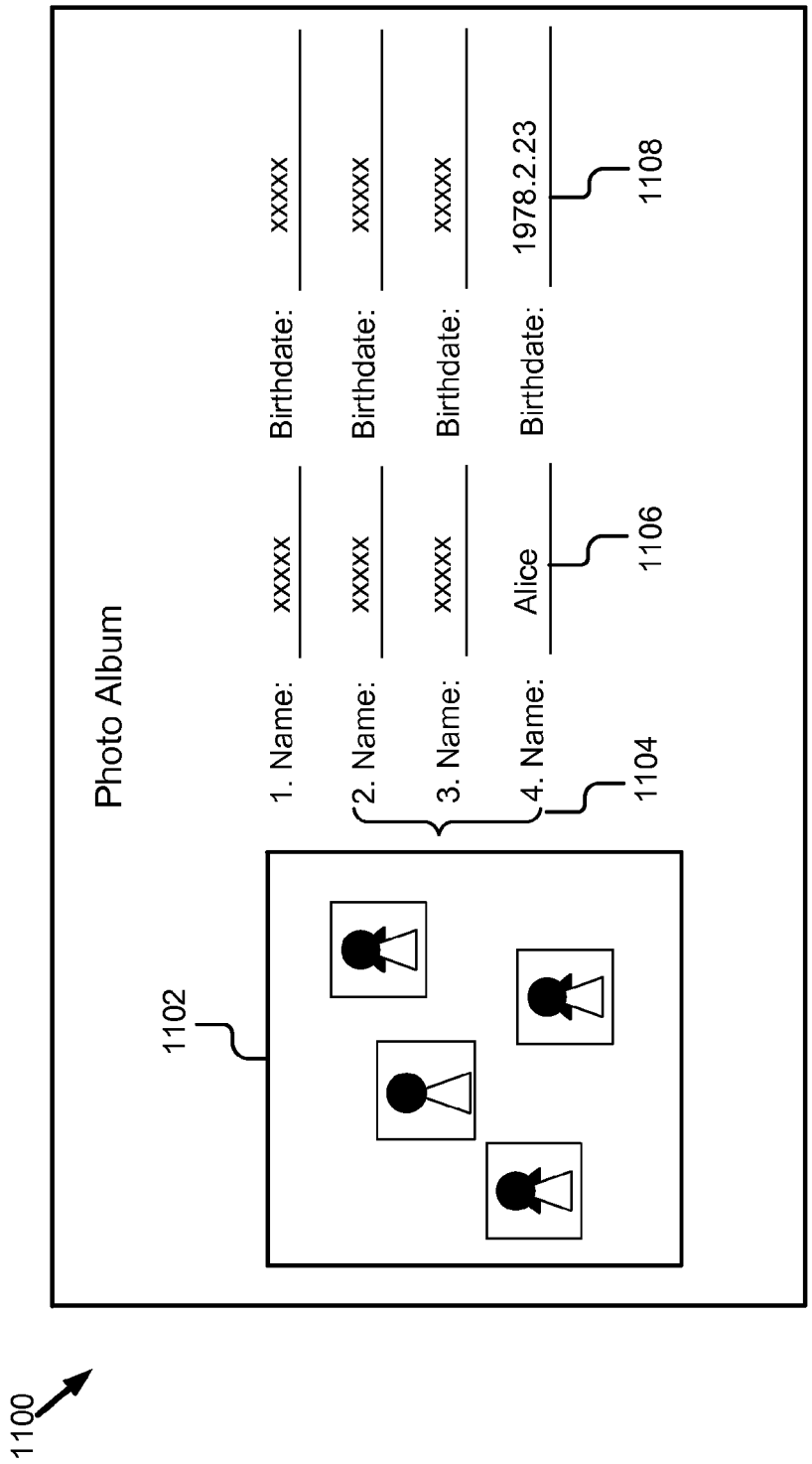
FIG. 11 is a graphic representation of an example of a modified photo album.

FIG. 11 is a graphic representation of an example photo album 1100 modified based on the photo album 1000 shown in FIG. 10. When a photo is received in the field 1102, the classifier 206 communicates with the analysis module 212 to determine that there are four people in the photo. The classifier 206 determines to add additional fields 1104 to include the information of the four people. The classifier 206 also communicates with the search engine 101 to determine the names and the birthdates for the four people. For example, the classifier 206 populates a name Alice in the field 1106 and the birthdate of Alice in the field 1108.

The foregoing description of the embodiments has been presented for the purposes of illustration and description. It is not intended to be exhaustive or to limit the specification to the precise form disclosed. Many modifications and variations are possible in light of the above teaching. It is intended that the scope of the embodiments be limited not by this detailed description, but rather by the claims of this application. As will be understood by those familiar with the art, the examples may be embodied in other specific forms without departing from the spirit or essential characteristics thereof. Likewise, the particular naming and division of the modules, routines, features, attributes, methodologies and other aspects are not mandatory or significant, and the mechanisms that implement the description or its features may have different names, divisions and/or formats. Furthermore, as will be apparent to one of ordinary skill in the relevant art, the modules, routines, features, attributes, methodologies and other aspects of the specification can be implemented as software, hardware, firmware or any combination of the three. Also, wherever a component, an example of which is a module, of the specification is implemented as software, the component can be implemented as a standalone program, as part of a larger program, as a plurality of separate programs, as a statically or dynamically linked library, as a kernel loadable module, as a device driver, and/or in every and any other way known now or in the future to those of ordinary skill in the art of computer programming. Additionally, the specification is in no way limited to implementation in any specific programming language, or for any specific operating system or environment. Accordingly, the disclosure is intended to be illustrative, but not limiting, of the scope of the specification, which is set forth in the following claims.

What is claimed is:

1. A computer-implemented method comprising:
receiving multimedia data on a form;
identifying, using one or more computing devices, at least one field in the form to be modified;
modifying, using the one or more computing devices, the at least one field in the form based on the multimedia data;
identifying an object based on the multimedia data;
determining a set of characteristics that are associated with the object, wherein the multimedia data does not include the set of characteristics;
determining that the form lacks corresponding fields to include the set of characteristics determined for the object;
adding the fields corresponding to the set of characteristics to the form;
modifying the corresponding fields in the form to include the set of characteristics; and
providing the modified form to a user.

2. The method of claim 1, wherein identifying the at least one field in the form to be modified further comprises:
analyzing the multimedia data; and
identifying the at least one field in the form that is related to content in the multimedia data.

3. The method of claim 1, wherein receiving the multimedia data on the form further comprises receiving the multimedia data that is associated with the at least one field of the form.

4. The method of claim 3, wherein identifying the at least one field in the form to be modified further comprises analyzing the multimedia data to identify at least one person or the object.

5. The method of claim 3, wherein modifying the at least one field in the form based on the multimedia data further comprises populating other fields in the form based on the analysis.

6. The method of claim 1, wherein identifying the at least one field in the form to be modified further comprises:
classifying the multimedia data based on a set of classifiers associated with fields in the form; and
identifying the at least one field in the form to include the classified multimedia data.

7. The method of claim 6, wherein modifying the at least one field in the form is based on the classified multimedia data.

8. The method of claim 1, further comprising generating a form template for the form, the form template including a set of fields associated with data types and classifiers.

9. The method of claim 8, wherein generating the form template further comprises:
determining the set of fields included in the form;
associating each field in the set of fields with a data type; and
wherein the data type includes a multimedia type.

10. The method of claim 8, wherein generating the form template further comprises:
collecting samples of the form filled in by a plurality of users;
creating a classifier for each field in the set of fields using the collected samples; and
associating each field in the set of fields with the classifier.

11. A system comprising:
one or more processors;
a controller stored on a memory and executable by the one or more processors, the controller configured to receive multimedia data on a form;

a classifier configured to identify at least one field in the form to be modified and modify the at least one field in the form based on the multimedia data, identify an object based on the multimedia data, determine a set of characteristics that are associated with the object, wherein the multimedia data does not include the set of characteristics, determine that the form lacks corresponding fields to include the set of characteristics determined for the object, add the fields corresponding to the set of characteristics to the form, and modify the corresponding fields in the form to include the set of characteristics; and a user interface engine configured to provide the modified form to a user.

12. The system of claim 11, wherein identifying the at least one field in the form to be modified further comprises:
analyzing the multimedia data; and
identifying the at least one field in the form that is related to content in the multimedia data.

13. The system of claim 11, wherein receiving the multimedia data on the form further comprises receiving the multimedia data that is associated with the at least one field of the form.

14. The system of claim 13, wherein identifying the at least one field in the form to be modified further comprises analyzing the multimedia data to identify at least one person or the object.

15. The system of claim 13, wherein modifying the at least one field in the form based on the multimedia data further comprises populating other fields in the form based on the analysis.

16. The system of claim 11, wherein identifying the at least one field in the form to be modified further comprises:
classifying the multimedia data based on a set of classifiers associated with fields in the form; and
identifying the at least one field in the form to include the classified multimedia data.

17. The system of claim 16, wherein modifying the at least one field in the form is based on the classified multimedia data.

18. A computer program product comprising a non-transitory computer useable medium including a computer readable program, wherein the computer readable program when executed on a computer causes the computer to:
receive multimedia data on a form;
identify at least one field in the form to be modified;
modify the at least one field in the form based on the multimedia data;
identify an object based on the multimedia data;
determine a set of characteristics that are associated with the object, wherein the multimedia data does not include the set of characteristics;
determine that the form lacks corresponding fields to include the set of characteristics determined for the object;
add the fields corresponding to the set of characteristics to the form;
modify the corresponding fields in the form to include the set of characteristics; and
provide the modified form to a user.

* * * * *